United States Patent
Shimizu et al.

(10) Patent No.: US 11,881,016 B2
(45) Date of Patent: Jan. 23, 2024

(54) METHOD AND SYSTEM FOR PROCESSING AN IMAGE AND PERFORMING INSTANCE SEGMENTATION USING AFFINITY GRAPHS

(71) Applicants: TOYOTA MOTOR EUROPE, Brussels (BE); KATHOLIEKE UNIVERSITEIT LEUVEN, Leuven (BE)

(72) Inventors: Hiroaki Shimizu, Brussels (BE); Bert De Brabandere, Leuven (BE); Davy Neven, Leuven (BE); Marc Proesmans, Leuven (BE); Luc Van Gool, Leuven (BE)

(73) Assignees: TOYOTA MOTOR EUROPE, Brussels (BE); KATHOLIEKE UNIVERSITEIT LEUVEN, K.U. LEUVEN R&D, Leuven (BE)

( * ) Notice: Subject to any disclaimer, the term of this patent is extended or adjusted under 35 U.S.C. 154(b) by 373 days.

(21) Appl. No.: 17/264,164

(22) PCT Filed: Sep. 21, 2018

(86) PCT No.: PCT/EP2018/075710
§ 371 (c)(1),
(2) Date: Jan. 28, 2021

(87) PCT Pub. No.: WO2020/057758
PCT Pub. Date: Mar. 26, 2020

(65) Prior Publication Data
US 2021/0287049 A1    Sep. 16, 2021

(51) Int. Cl.
*G06N 3/08*    (2023.01)
*G06F 18/21*   (2023.01)
(Continued)

(52) U.S. Cl.
CPC .......... *G06V 20/00* (2022.01); *G06F 18/2163* (2023.01); *G06F 18/29* (2023.01);
(Continued)

(58) Field of Classification Search
CPC ...... G06N 3/08; G06N 3/045; G06F 18/2163; G06F 18/2413; G06F 18/29; G06V 10/26;
(Continued)

(56) References Cited

U.S. PATENT DOCUMENTS

2010/0266175 A1* 10/2010 Seung ............... G06T 7/12
                                                382/128
2012/0250933 A1* 10/2012 Porikli ............. G06T 7/143
                                                382/100
(Continued)

OTHER PUBLICATIONS

Jiwoon Ahn,"Learning Pixel-level Semantic Affinity with Image-level Supervision for Weakly Supervised Semantic Segmentation,"—Jun. 2018, Proceedings of the IEEE Conference on Computer Vision and Pattern Recognition (CVPR), 2018,pp. 4981-4988.*

(Continued)

*Primary Examiner* — Omar S Ismail
(74) *Attorney, Agent, or Firm* — Sughrue Mion, PLLC

(57) ABSTRACT

A system and a method for processing an image so as to perform instance segmentation. The system/method includes: a—inputting (S1) the image (IMG) to a first neural network configured to output an affinity graph (AF), and b—inputting (S2), to a second neural network, the affinity graph and a predefined seed-map (SM), so as to determine whether other pixels belong to a same instance, and set at a first value the value of the other pixels determined as belonging to the same instance.

8 Claims, 3 Drawing Sheets

(51) Int. Cl.

| | |
|---|---|
| *G06N 3/045* | (2023.01) |
| *G06V 10/82* | (2022.01) |
| *G06V 10/44* | (2022.01) |
| *G06V 10/26* | (2022.01) |
| *G06V 20/00* | (2022.01) |
| *G06F 18/20* | (2023.01) |
| *G06V 10/764* | (2022.01) |
| *G06V 20/56* | (2022.01) |

(52) U.S. Cl.
CPC .............. *G06N 3/045* (2023.01); *G06N 3/08* (2013.01); *G06V 10/26* (2022.01); *G06V 10/454* (2022.01); *G06V 10/764* (2022.01); *G06V 10/82* (2022.01); *G06V 20/56* (2022.01)

(58) Field of Classification Search
CPC .... G06V 10/454; G06V 10/764; G06V 10/82; G06V 20/00; G06V 20/56
See application file for complete search history.

(56) References Cited

U.S. PATENT DOCUMENTS

| | | | | |
|---|---|---|---|---|
| 2014/0300767 | A1* | 10/2014 | Lischinski | H04N 23/951 |
| | | | | 348/208.6 |
| 2017/0076438 | A1* | 3/2017 | Kottenstette | G06F 18/2413 |
| 2019/0244060 | A1* | 8/2019 | Dundar | G06N 3/08 |
| 2019/0284552 | A1* | 9/2019 | Collins | C12Q 1/6827 |
| 2020/0156246 | A1* | 5/2020 | Srivastav | G06V 10/82 |
| 2020/0211206 | A1* | 7/2020 | Wang | G06N 3/08 |
| 2020/0342603 | A1* | 10/2020 | Orasanu | G06T 7/0014 |
| 2020/0410669 | A1* | 12/2020 | Psota | G06T 7/0012 |
| 2021/0261148 | A1* | 8/2021 | Li | G06V 20/584 |

OTHER PUBLICATIONS

Yiding Liu,"Affinity Derivation and Graph Merge for Instance Segmentation,"Sep. 2018, Proceedings of the European Conference on Computer Vision (ECCV), 2018,pp. 1-13.*

Davy Neven,"Instance Segmentation by Jointly Optimizing Spatial Embeddings and Clustering Bandwidth,"Jun. 2019, Proceedings of the IEEE/CVF Conference on Computer Vision and Pattern Recognition (CVPR), 2019, pp. 8837-8844.*

Xinjing Cheng,"Depth Estimation via Affinity Learned with Convolutional Spatial Propagation Network,"Sep. 2018, Proceedings of the European Conference on Computer Vision (ECCV), 2018,pp. 1-8.*

Jan Funke,"Large Scale Image Segmentation with Structured Loss Based Deep Learning for Connectome Reconstruction,"May 23, 2018,IEEE Transactions On Pattern Analysis and Machine Intelligence, vol. 41, No. 7, Jul. 2019,pp. 1669-1674.*

Steffen Wolf,"Learned Watershed: End-To-End Learning of Seeded Segmentation,"Oct. 2017,Proceedings of the IEEE International Conference on Computer Vision (ICCV), 2017,pp. 2011-2017.*

Katerina Fragkiadaki,"Learning to Segment Moving Objects in Videos,"Jun. 2015, Proceedings of the IEEE Conference on Computer Vision and Pattern Recognition (CVPR), 2015,pp. 4083-4086.*

Li Zhou,"Salient Region Detection Using Diffusion Process on a Two-Layer Sparse Graph,"Aug. 11, 2017, IEEE Transactions On Image Processing, vol. 26, No. 12, Dec. 2017,pp. 5882-5889.*

Swarnendu Ghosh, "Understanding Deep Learning Techniques for Image Segmentation,"Aug. 2019,ACM Computing Surveys, vol. 52, No. 4, Article 73.pp. 73:1-73:20.*

Jan Funke et al., "Large Scale Image Segmentation with Structured Loss based Deep Learning for Connectome Reconstruction", IEEE Transactions On Pattern Analysis and Machine Intelligence, May 24, 2018, 12 pages.

Steffen Wolf et al., "Learned Watershed: End-to-End Learning of Seeded Segmentation", arxiv.org, Cornell University Library, 201 Olin Library Cornell University Ithaca, NY 14853, Apr. 7, 2017, 9 pages.

International search report for PCT/EP2018/075710 dated Jun. 5, 2019.

Written opinion for PCT/EP2018/075710 dated Jun. 5, 2019.

\* cited by examiner

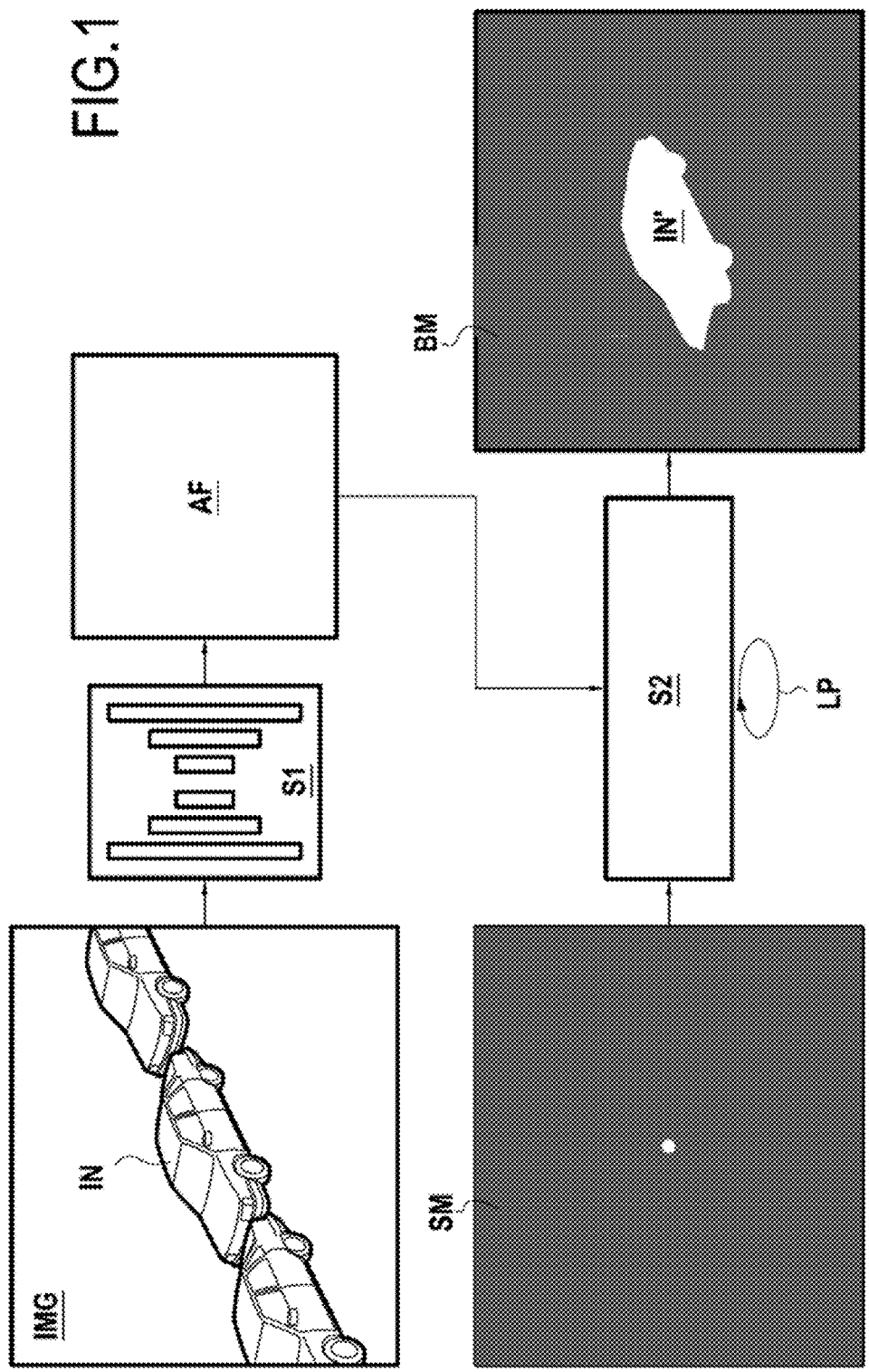

METHOD AND SYSTEM FOR PROCESSING AN IMAGE AND PERFORMING INSTANCE SEGMENTATION USING AFFINITY GRAPHS

CROSS-REFERENCE TO RELATED APPLICATIONS

This application is a National Stage of International Application No. PCT/EP2018/075710 filed Sep. 21, 2018.

FIELD OF THE DISCLOSURE

The present disclosure is related to the field of image processing and more particularly to the field of instance segmentation.

DESCRIPTION OF THE RELATED ART

Processing images may be used to detect various objects visible on the image. Such processing is therefore particularly useful for self-driving vehicles (partially or fully self-driving) and for other types of automated systems, because these systems have to be able to understand their surroundings on the basis of images acquired by cameras.

Instance segmentation methods have been proposed to precisely delineate objects which are visible on an image (in other words, different objects are called different instances).

It has been proposed to use neural networks such as deep neural networks to perform this instance segmentation. A deep neural network is a machine learning model having parameters which may be adjusted by stochastic gradient descent during a training phase to minimize the value of an objective function ("loss function"). The training phase comprises of feeding the network with labeled input-output pairs: known images with an instance segmentation which has been prepared by an operator. The specific structure and implementation of the network may be called a "network architecture".

Known methods for performing instance segmentation have the following deficiencies: inability to handle complex occlusions, difficulty to detect non-rigid shapes (snakes, noodles, cells in medical imaging, etc.), accidental splits and merges, slow convergence during training, or long computational duration.

SUMMARY OF THE DISCLOSURE

The present disclosure overcomes one or more deficiencies of the prior art by proposing a method for processing an image so as to perform instance segmentation, comprising:
a—inputting the image to a first neural network configured to output, for each pixel of the image, an affinity vector wherein the components of the vector are each associated with other pixels of the image at positions relative to the pixel predefined in an affinity pattern, the value of each component being set to a first value if the neural network determines that the other pixel associated with the component belongs to the same instance as the pixel of the image and set to a second value which differs from the first value if the neural network determines that the other pixel associated with the component does not belong to the same instance as the pixel of the image, the affinity vectors of all the pixels of the image forming an affinity graph,
b—inputting, to a second neural network, the affinity graph and a predefined seed-map having the resolution of the image and at least one pixel having a value set to the first value, so as to:

determine whether other pixels belong to the same instance as the at least one pixel of the seed-map having a value set to the first value, and
set at the first value the value of the other pixels determined as belonging to the same instance as the at least one pixel of the seed-map having a value set to the first value.

The present invention therefore proposes to use an affinity graph in a first step. An affinity graph is a graph well known to the skilled person. Typically, it is a graph having nodes wherein the nodes are each associated with a pixel of the image, and each node has edges connecting it to neighboring nodes. The edges are set either to the first value or to the second value depending on whether or not the two nodes connected by the edge belong to the same instance or not.

An affinity graph may be represented as a tensor having the resolution of the image and a depth which depends on the number of pixels of the affinity pattern. For example, if the affinity pattern is defined by the eight pixels directly surrounding a pixel, then the depth of the tensor is eight. The person skilled in the art may call the other pixels the connections or edges of the pixel.

The invention is not limited to affinity patterns comprising eight pixels and may comprise more complex patterns with more pixels.

Preferably, the affinity pattern of a pixel comprises pixels which are close to the pixel.

In an affinity vector, if the affinity pattern of a pixel is associated with a component of the affinity vector, then this component is set to the first value.

It has been observed by the inventors that an affinity graph taken alone does not provide good instance segmentation results. This is due to the fact that a single affinity determination error can lead to a faulty split or merger of two instances. By way of example, traditional algorithms related to region growing, watershed algorithms or clustering as possible alternatives to determine the instances, may cause over- or under-segmentation.

Thus, by using a second neural network and the affinity graph to expand a seed-map, an additional determination (or prediction) step is carried out to as to obtain more accurate results. It also ensures a strong coupling between the particular output of the affinity network and the seed propagation process.

It should be noted that the first value may be equal to "1" and the second value may be equal to "0".

According to a particular embodiment, the method comprises iteratively repeating step b using the seed-map modified in the previous iteration.

The person skilled in the art may determine the number of iterations required for obtaining a good result, and this determination may take into account the resolution of the image, the size of the instances on the images, and the desired level of accuracy. For example, the number of iterations may be of the order of 20.

According to a particular embodiment, step b comprises:
for each pixel of the seed-map, determining the soft minimum vector of the affinity vector in the affinity graph associated with the pixel of the seed-map, and of a second vector having components which are the values of other pixels of the seed-map at positions relative to the pixel predefined in the affinity pattern,
determining the soft maximum of the values of said soft minimum vector, setting the value of the pixel to said soft maximum.

These steps perform said inputting to a second neural network, with the determination of other pixels belonging to the same instance and the setting at the first value.

Should this step b be repeated, a binary mask is obtained which delineates at least the instance associated with the at least one pixel having a value set to the first value.

It should be noted that the implementation of this step is differentiable (its derivative exists) and it is therefore possible to back-propagate a loss through it.

It should be noted that the same affinity pattern is used for a pixel of the image and for a pixel of the seed-map: the above mentioned first and second vector therefore have the same length because their components are associated with the same number of pixels.

Also, it should be noted that the seed-map, the image, and the affinity graph have the same resolution.

According to a particular embodiment, the first neural network is a deep neural network and the second neural network is a recurrent neural network.

The use of a recurrent neural allows using a fixed, non-learnable (or trainable) implementation which stills allows back-propagation of a loss.

According to a particular embodiment, the predefined seed-map is generated by the first neural network.

By way of example, the seed-map may be generated by a neural-network module which performs object detection and outputs bounding box coordinates for each object detected, the coordinates of the center of each bounding box may be used in seed-maps by setting the corresponding pixels to the first value.

Alternatively, a user may select a pixel of an instance visible on the image through an interface and the pixel of the seed-map having the same coordinates may be set to the first value (while all the other pixels may be set to the second value).

According to a particular embodiment, the method comprises a preliminary training step including processing a known template image and determining a loss, so as to back-propagate the loss through at least the first neural network.

It should be noted that if the image is known, a predetermined instance segmentation may have been prepared. For example, this predetermined instance segmentation may have been prepared by an operator. It is possible to determine the difference between this predetermined instance segmentation and the one obtained using the above method. The person skilled in the art will know which loss function should be used.

The invention also provides a system for processing an image so as to perform instance segmentation, comprising:
  a module for inputting the image to a first neural network configured to output, for each pixel of the image, an affinity vector wherein the components of the vector are each associated with other pixels of the image at positions relative to the pixel predefined in an affinity pattern, the value of each component being set to a first value if the neural network determines that the other pixel associated with the component belongs to the same instance as the pixel of the image and set to a second value which differs from the first value if the neural network determines that the other pixel associated with the component does not belong to the same instance as the pixel of the image, the affinity vectors of all the pixels of the image forming an affinity graph,
  a module for inputting, to a second neural network, the affinity graph and a predefined seed-map having the resolution of the image and at least one pixel having a value set to the first value, so as to:
    determine whether other pixels belong to the same instance as the at least one pixel of the seed-map having a value set to the first value, and
    set at the first value the value of the other pixels determined as belonging to the same instance as the at least one pixel of the seed-map having a value set to the first value.

This system may be configured to perform all the steps of the method as defined above.

In one particular embodiment, the steps of the method for processing an image are determined by computer program instructions.

Consequently, the invention is also directed to a computer program for executing the steps of a method as described above when this program is executed by a computer.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

How the present disclosure may be put into effect will now be described by way of example with reference to the appended drawings, in which:

FIG. 1 is a block diagram of an exemplary method for processing an image according to an example.

DESCRIPTION OF THE EMBODIMENTS

Figure 3:
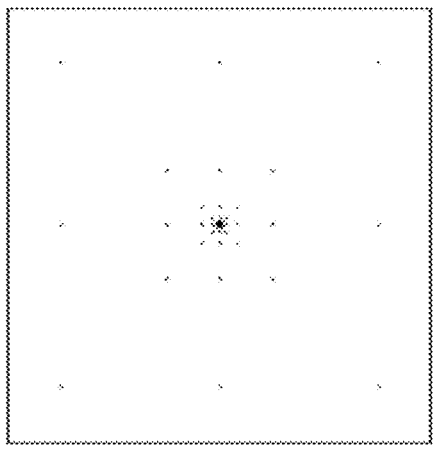
FIG. 3 is an example of affinity pattern.

An exemplary method and system for processing an image will be described hereinafter.

A method for processing an image is represented on FIG. 1. This method is configured to perform instance segmentation on an image IMG which is an image of a street on which cars are visible. These cars are instances and in the illustrated example, a car is referenced IN.

In a first step S1, the image IMG is inputted to a deep neural network configured to output, for each pixel of the image, an affinity vector wherein the components of the vector are each associated with other pixels of the image at positions relative to the pixel predefined in an affinity pattern, the value of each component being set to a first value if the neural network determines that the other pixel associated with the component belongs to the same instance as the pixel of the image and set to a second value which differs other pixel associated with the component does not belong to the same instance as the pixel of the image, the affinity vectors of all the pixels of the image forming an affinity graph AF visible on FIG. 1.

The first value may be equal to "1" and the second value may be equal to "0".

Then, a seed-map SM is prepared. For example, during training, it is possible to use a binary image having the same resolution as the image IMG (and the same resolution as the affinity graph AF), with all the pixel values set to the second value and at least one random pixel set to the first value.

Preferentially, the at least one pixel having a value set to the first value is selected so as to be distant (further than a predefined threshold) from the border.

In the illustrated example, the pixel having a value set to the first value is located at a position which, in the image IMG, corresponds to the car IN.

Then, a second step S2 is performed by inputting, to a second neural network (in this example a fixed, non-learnable recurrent neural network), the affinity graph and a predefined seed-map having the resolution of the image and at least one pixel having a value set to the first value, so as to:

determine whether other pixels belong to the same instance as the at least one pixel of the seed-map having a value set to the first value, and set at the first value the value of the other pixels determined as belonging to the same instance as the at least one pixel of the seed-map having a value set to the first value.

This will expand the number of pixels in the seed-map set to the first value and transforms the seed-map into a segmentation mask at least for one instance.

It should be noted that performing step S2 with another seed-map may result in obtaining a segmentation mask for another object, for example if the at least one pixel of the seed-map having a value set to the first value is located at a position which, on the image, corresponds to another instance.

Preferentially, step S2 is repeated in an iterative loop LP.

A binary mask BM is obtained with the pixels having the first value represented in white and the pixels having the second value represented in white. The car of the image IMG is delineated in the mask as instance IN'.

Figure 2:
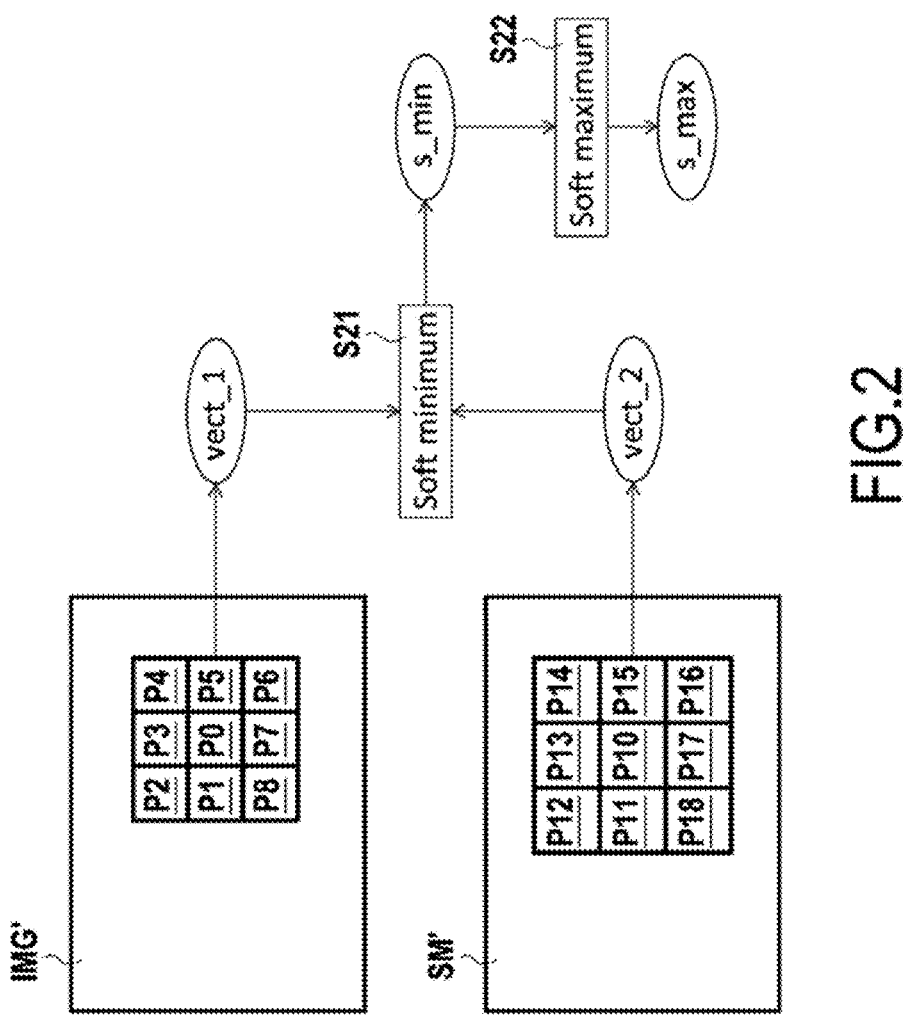
FIG. 2 is a more detailed representation of the second step of the invention according to an example.

An exemplary implementation of step S2 (described in reference to FIG. 1) is represented on FIG. 2.

FIG. 2 is directed to the processing of one pixel P10 of a seed-map SM'.

On this figure, an image IMG' has been processed to obtain an affinity graph and more precisely, for the pixel P0 of image IMG' which has the same coordinates as the pixel P10 of the seed-map, an affinity vector vect_1 is obtained. This affinity vector is formed using an affinity pattern including the eight pixels surrounding a pixel. For pixel P0, these pixels are represented on the figure and referenced P1, P2, P3, P4, P5, P6, P7, and P8.

from the seed-map SM', a second vector vect_2 having components which are the values of other pixels of the seed-map at positions relative to P10 which are predefined in the affinity pattern used to obtain vect_1. vect_2 is obtained with the values of pixels P11, P12, P13, P14, P15, P16, P17, and P18 of the seed-map SM'.

A soft minimum of vectors vect_1 and vect_2 is determined in step S21, which provides a vector s_min.

The soft maximum of the components of the vector s_min is then determined (step S22) to obtain a value s_max which is the new value of pixel P10.

It should be noted that the soft maximum operation may be defined as:

$$\text{softmax}(x) = \sum_{j=1}^{K} \frac{\exp(x_j) * x_j}{\sum_{k=1}^{K} \exp(x_k)}$$

Wherein x is a vector comprising K components $x_j$. The soft minimum is defined as:

$$\text{softmin}(x) = \text{softmax}(-x)$$

In the above embodiment, the soft minimum is determined for two vectors vect_1 and vect_2 by determining the soft minimum of between the corresponding components of the vectors. For example, the soft minimum is determined for P1 and P11 to obtain a component of vector s_min, and the soft minimum formula is used for each component of vector s_min.

The soft maximum s_max is determined between all the components of vector s_min.

FIG. 3 is a more complex affinity pattern. In this example, the center pixel (the pixel associated with this affinity pattern) belongs to the affinity pattern and therefore has a value set to the first value because a pixel and itself belong to the same instance.

The pattern further comprises the 8 direct neighbors of the pixel, and further groups of eight pixels centered around the center of the pattern at positions defined by the skilled person as 3-dilated, 8-dilated, 24-dilated and 72-dilated neighbors.

There are 1+5*8=41 pixels in the pattern and the depth of the affinity graph is 41.

It should be noted that in order to process the edges of an image and an affinity pattern extending outside the image, the affinity of a pixel with the outside of the image is set to the second value.

Figure 4:
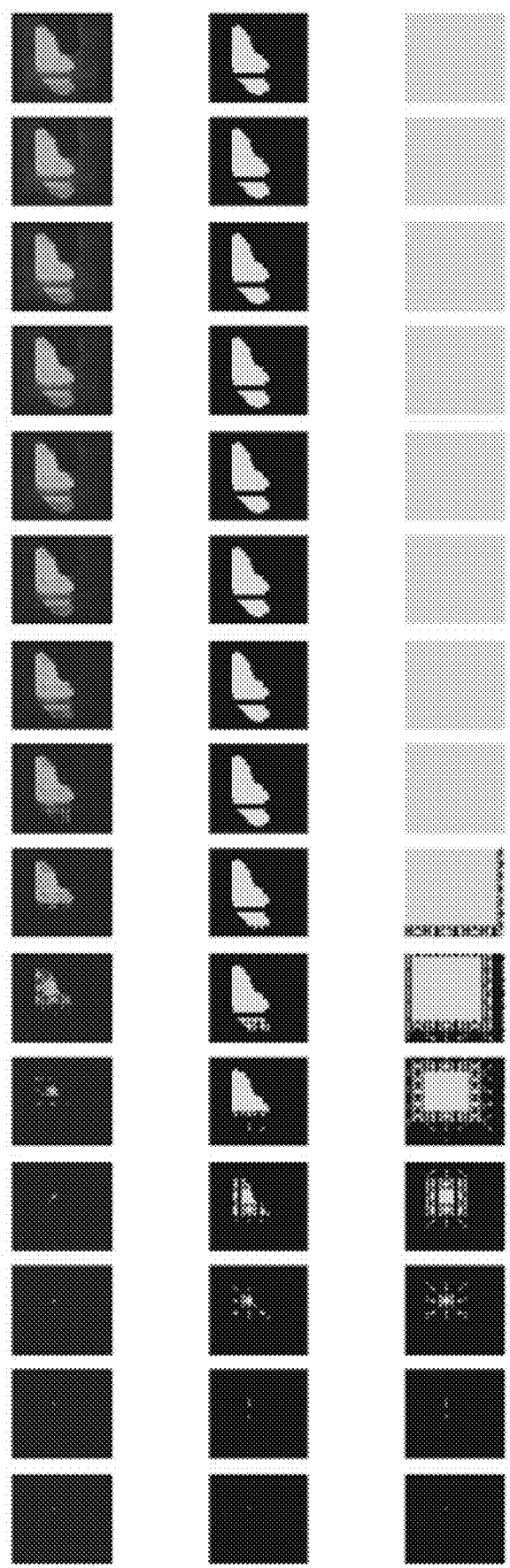
FIG. 4 shows intermediary and final results of the method.

FIG. 4 is a representation of a seed-map after each iteration of a process in which step S2 described in reference to FIG. 1 is repeated 15 times.

The first row corresponds to an implementation of the present invention.

The second row corresponds to an implementation in which the affinity graph is replaced with a "ground-truth". A ground-truth designates a predefined output of a neural network, for example prepared by an operator. The operator has manually performed instance segmentation, which allows obtaining a perfect affinity graph.

As can be seen through a comparison of the first and second row, the invention provides results which are close to the ground-truth.

The last row corresponds to an implementation wherein all the affinities are set to the first value (for example "1"). This leads to a quick expansion to the full image and shows the evolution of the receptive field. The receptive field, an expression well known to the skilled person, at a pixel location, is the image region that has the ability to influence the output at that pixel location. Because of the restricted connectivity of patterns such as shown on FIG. 3 (usually called sparse connectivity), the receptive field in a single iteration is limited but may grow over multiple iterations.

Figure 5:
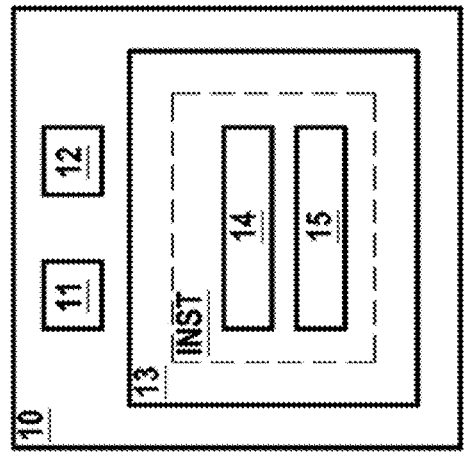
FIG. 5 shows a system according to an example.

The steps of the methods described in reference to FIG. 1 can be determined by computer instructions. These instructions can be executed on a processor of a system, as represented on FIG. 5.

On this figure, a system 10 has been represented. This system comprises a processor 11, an acquisition module 12 configured to acquire images, and a memory 13.

The memory 13 can be a non-volatile memory and it comprises a set of instructions (or computer program) INST which can be executed by the processor 11 to perform the method described in reference to FIG. 1. The set of instructions INST comprises:

an instruction 14 to input the image to a first neural network configured to output, for each pixel of the image, an affinity vector wherein the components of the vector are each associated with other pixels of the image at positions relative to the pixel predefined in an affinity pattern, the value of each component being set to a first value if the neural network determines that the other pixel associated with the component belongs to the same instance as the pixel of the image and set to a second value which differs from the first value if the neural network determines that the other pixel associated with the component does not belong to the same instance as the pixel of the image, the affinity vectors of all the pixels of the image forming an affinity graph, an instruction 15 to input, to a second neural network, the affinity graph and a predefined seed-map having the resolution of the image and at least one pixel having a value set to the first value, so as to:
determine whether other pixels belong to the same instance as the at least one pixel of the seed-map having a value set to the first value, and
set at the first value the value of the other pixels determined as belonging to the same instance as the at least one pixel of the seed-map having a value set to the first value.

It should be noted that the instruction 14 may form the deep neural network described in reference to FIG. 1 while the instruction 15 may form the recurrent neural network described in reference to FIG. 1.

The invention claimed is:

1. A method for processing an image so as to perform instance segmentation, comprising:
a—inputting the image to a first neural network configured to output, for each pixel of the image, an affinity vector wherein the components of the vector are each associated with other pixels of the image at positions relative to the pixel predefined in an affinity pattern, the value of each component being set to a first value if the neural network determines that the other pixel associated with the component belongs to the same instance as the pixel of the image and set to a second value which differs from the first value if the neural network determines that the other pixel associated with the component does not belong to the same instance as the pixel of the image, the affinity vectors of all the pixels of the image forming an affinity graph,
b—inputting, to a second neural network, the affinity graph and a predefined seed-map having the resolution of the image and at least one pixel having a value set to the first value, so as to:
determine whether other pixels belong to the same instance as the at least one pixel of the seed-map having a value set to the first value, and
set at the first value the value of the other pixels determined as belonging to the same instance as the at least one pixel of the seed-map having a value set to the first value.

2. The method of claim 1, comprising iteratively repeating step b using the seed-map modified in the previous iteration.

3. The method of claim 2, wherein step b comprises:
for each pixel of the seed-map, determining the soft minimum vector of the affinity vector in the affinity graph associated with the pixel of the seed-map, and of a second vector having components which are the values of other pixels of the seed-map at positions relative to the pixel predefined in the affinity pattern,
determining the soft maximum of the values of said soft minimum vector,
setting the value of the pixel to said soft maximum.

4. The method of claim 1, wherein the first neural network is a deep neural network and the second neural network is a recurrent neural network.

5. The method of claim 1, wherein the predefined seed-map is generated by the first neural network.

6. The method of claim 1, comprising a preliminary training step including processing a known template image and determining a loss, so as to back-propagate the loss through at least the first neural network.

7. A system for processing an image so as to perform instance segmentation, comprising:
a module for inputting the image to a first neural network configured to output, for each pixel of the image, an affinity vector wherein the components of the vector are each associated with other pixels of the image at positions relative to the pixel predefined in an affinity pattern, the value of each component being set to a first value if the neural network determines that the other pixel associated with the component belongs to the same instance as the pixel of the image and set to a second value which differs from the first value if the neural network determines that the other pixel associated with the component does not belong to the same instance as the pixel of the image, the affinity vectors of all the pixels of the image forming an affinity graph,
a module for inputting, to a second neural network, the affinity graph and a predefined seed-map having the resolution of the image and at least one pixel having a value set to the first value, so as to:
determine whether other pixels belong to the same instance as the at least one pixel of the seed-map having a value set to the first value, and
set at the first value the value of the other pixels determined as belonging to the same instance as the at least one pixel of the seed-map having a value set to the first value.

8. A non-transitory computer readable medium readable by a computer and having recorded thereon a computer program including instructions that when executed by a processor cause the processor to process an image so as to perform instance segmentation, processing the image comprising:
a—inputting the image to a first neural network configured to output, for each pixel of the image, an affinity vector wherein the components of the vector are each associated with other pixels of the image at positions relative to the pixel predefined in an affinity pattern, the value of each component being set to a first value if the neural network determines that the other pixel associated with the component belongs to the same instance as the pixel of the image and set to a second value which differs from the first value if the neural network determines that the other pixel associated with the component does not belong to the same instance as the pixel of the image, the affinity vectors of all the pixels of the image forming an affinity graph, b—inputting, to a second neural network, the affinity graph and a predefined seed-map having the resolution of the image and at least one pixel having a value set to the first value, so as to:
  determine whether other pixels belong to the same instance as the at least one pixel of the seed-map having a value set to the first value, and
  set at the first value the value of the other pixels determined as belonging to the same instance as the at least one pixel of the seed-map having a value set to the first value.

* * * * *